United States Patent
Koo et al.

(10) Patent No.: US 8,547,867 B2
(45) Date of Patent: Oct. 1, 2013

(54) METHOD AND APPARATUS FOR INTERFERENCE IDENTIFICATION ON CONFIGURATION OF LTE AND BT

(75) Inventors: Changhoi Koo, Plano, TX (US); Youn Hyoung Heo, Kitchener (CA); Zhijun S. Cai, Euless, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 340 days.

(21) Appl. No.: 13/069,751

(22) Filed: Mar. 23, 2011

(65) Prior Publication Data

US 2012/0213116 A1     Aug. 23, 2012

Related U.S. Application Data

(60) Provisional application No. 61/444,628, filed on Feb. 18, 2011.

(51) Int. Cl.
*H04J 1/16*        (2006.01)
*H04J 3/16*        (2006.01)

(52) U.S. Cl.
USPC ............................ 370/252; 370/465; 370/466

(58) Field of Classification Search
USPC .................................. 370/338, 465, 466, 252
See application file for complete search history.

(56) References Cited

U.S. PATENT DOCUMENTS

| | | | |
|---|---|---|---|
| 2008/0107054 A1 | 5/2008 | Parts et al. | |
| 2008/0125128 A1 | 5/2008 | Yoo et al. | |
| 2008/0205365 A1* | 8/2008 | Russell et al. | 370/341 |
| 2009/0104909 A1 | 4/2009 | Vesely et al. | |
| 2011/0268024 A1* | 11/2011 | Jamp et al. | 370/328 |
| 2012/0082077 A1* | 4/2012 | Zhang et al. | 370/311 |
| 2012/0082140 A1* | 4/2012 | Lin et al. | 370/336 |
| 2012/0087341 A1* | 4/2012 | Jang et al. | 370/331 |
| 2012/0164948 A1* | 6/2012 | Narasimha et al. | 455/63.1 |
| 2012/0170557 A1* | 7/2012 | Tsfati et al. | 370/338 |
| 2012/0176923 A1* | 7/2012 | Hsu et al. | 370/252 |
| 2012/0182896 A1* | 7/2012 | Jang et al. | 370/252 |
| 2012/0195291 A1* | 8/2012 | Kuo | 370/336 |
| 2012/0207032 A1* | 8/2012 | Chen et al. | 370/252 |
| 2012/0207040 A1* | 8/2012 | Comsa et al. | 370/252 |
| 2012/0314598 A1* | 12/2012 | Sadek et al. | 370/252 |

FOREIGN PATENT DOCUMENTS

| | | |
|---|---|---|
| EP | 2169840 | 3/2010 |
| KR | 10-2004-0060459 | 7/2004 |
| WO | 2008142529 | 11/2008 |
| WO | WO 2009/137295 A2 | 11/2009 |
| WO | WO 2009/141490 A1 | 11/2009 |
| WO | WO 2010/002219 A2 | 1/2010 |

OTHER PUBLICATIONS

3GPP TR 36.318 V1.0.0 (Nov. 2010); "3rd Generation Partnership Project; Technical Specification Group Radio Access Networks; Evolved Universal Terrestrial Radio Access (E-UTRA); Study on Signalling and Procedure for Interference Avoidance for In-Device Coexistence (Release 10)"; Dec. 17, 2010; 34 pages.

(Continued)

*Primary Examiner* — Andrew Lee
(74) *Attorney, Agent, or Firm* — Fish & Richardson P.C.

(57) ABSTRACT

A method, system and device are provided for avoiding in-device coexistence interference between different radio technologies deployed in adjacent bands on the same device by estimating and identifying Bluetooth component interference activation when configuring LTE and non-LTE components to provide an in-device coexistence operation mode.

44 Claims, 4 Drawing Sheets

(56) References Cited

OTHER PUBLICATIONS

Baghel, Sudhir Kumar et al; "Coexistence Possibilities of LTE with ISM Technologies and GNSS"; IEEE 2011 National Conference on Communications; Jan. 28, 2011; 5 pages.

Catt; "FDM-Based Approach for In-Device Coexistence Interference"; 3GPP TSG RAN WG2 Meeting #71bis (R2-105336); Xi'an, China; Oct. 11-15, 2010; 2 pages.

Huawei, HiSilicon, CMCC; "Open Issues on FDM"; 3GPP TSG-RAN WG2 Meeting #72bis (R2-110383); Dublin, Ireland; Jan. 17-21, 2011; 4 pages.

MediaTek; "Trigger of UE Reporting for FDM Solution"; 3GPP TSG-RAN WG2 Meeting #72bis (R2-110258); Dublin, Ireland; Jan. 17-21, 2010; 4 pages.

Qualcomm Incorporated; "In-Device Coexistence Interference between LTE and ISM Bands"; 3GPP TSG-RAN WG4 Ad-hoc Meeting #10-03 (R4-102416); Bratislava, SK; Jun. 28-Jul. 2, 2010; 6 pages.

ZTE; "Considerations of the Detail Procedure for FDM Approach"; 3GPP TSG-RAN WG2 Meeting #72bis (R2-110243); Dublin, Ireland; Jan. 17-21, 2011; 6 pages.

International Search Report and Written Opinion of the International Searching Authority issued in International Application No. PCT/US2012/025594 on May 21, 2012; 13 pages.

International Search Report and Written Opinion of the International Searching Authority issued in International Application No. PCT/US2012/025598 on Jun. 6, 2012; 9 pages.

International Search Report and Written Opinion for PCT Application No. PCT/US2010/051183, mailed Jun. 29, 2011.

International Search Report and Written Opinion for PCT Application No. PCT/US2010/051193, mailed Jun. 29, 2011.

International Search Report and Written Opinion for PCT Application No. PCT/US2010/051197, mailed Jun. 29, 2011.

Intel Corporation (UK) Ltd., Discussion on In-Device Coexistence Scenarios and Solutions, 3GPP Draft, R2-104382, 3rd Generation Partnership Project (3GPP), Mobile Competence Centre, 650, Route des Lucioles, F-06921 Sophia-Antipolis Cedex, France, vol. RAN WG2, No. Madrid Spain, 20100823, Aug. 16, 2010.

Qualcomm Incorporated, Problem Scenarios and Proposed Solutions for In-Device Coexistence, GPP Draft, R2-104910, 3rd Generation Partnership Project (3GPP), Mobile Competence Centre, 650, Route des Lucioles, F-06921 Sophia-Antipolis Cedex, France, vol. RAN WG2, No. Madrid Spain, 20100823, Aug. 17, 2010.

LG Electronics Inc., Possible Solutions for In-Device Interference Avoidance, GPP Draft, R2-104880, 3rd Generation Partnership Project (3GPP), Mobile Competence Centre, 650, Route des Lucioles, F-06921 Sophia-Antipolis Cedex, France, vol. RAN WG2, No. Madrid Spain, 20100823, Aug. 17, 2010.

\* cited by examiner

METHOD AND APPARATUS FOR INTERFERENCE IDENTIFICATION ON CONFIGURATION OF LTE AND BT

CROSS-REFERENCE TO RELATED APPLICATION

This application claims the benefit under 35 U.S.C. §119(e) of U.S. Provisional Application No. 61/444,628, filed Feb. 18, 2011, entitled "Method and Apparatus for Interference Identification on Configuration of LTE and BT. U.S. Provisional Application No. 61/444,628 includes exemplary systems and methods and is incorporated by reference in its entirety.

BACKGROUND OF THE INVENTION

1. Field of the Invention

The present invention is directed in general to communications systems and methods for operating same. In one aspect, the present invention relates to the methods, systems and devices for managing coexistence interference between different radio technologies deployed in adjacent bands.

2. Description of the Related Art

The growing market of smart connected devices requires that the same device supports multiple radio technologies on the in-device platform. However, some configurations may cause severe performance degradation due to the in-device coexistence interference. For example, with devices that support both Long Term Evolution (LTE) and Industrial, Science and Medical (ISM) technologies (such as Bluetooth and/or WLAN) and/or Global Navigation Satellite System (GNSS) technologies, there are use cases for concurrent operation of these radios. The coexistence issues arise between ISM and/or GNSS technologies and LTE deployed in adjacent bands. As shown in Table 1 below, coexistence interference arises where ISM transmission creates interference to the LTE receiver, and also arises where LTE transmission creates interference to the ISM receiver.

TABLE 1

Interference of the LTE and ISM components on the in-device configuration

| LTE TDD (2.3-2.4 GHz, Band 40) | ISM | |
|---|---|---|
| LTE UL (2.5-2.6 GHz, Band 7) | (2.4-2.4835 GHz) | Coexistence |
| Rx | Tx | LTE: Interfered |
| | | ISM: Normal |
| Tx | Rx | LTE: Normal |
| | | ISM: Interfered |

Similar coexistence issues occur with devices that include both LTE and GNSS components. As shown in Table 2 below, when LTE and GNSS components are working on the same device, there will be interference due to adjacent frequency band operation or harmonic frequencies which cannot be avoided by the allocation of a guard band at the sub-harmonic frequency.

TABLE 2

Interference of the LTE and GNSS component configuration on in-device

| LTE (777-787 MHz/746-756 MHz, Band 13) (788-798 MHz/758-768 MHz, Band 14) | GNSS (1575.42 MHz) | Coexistence |
|---|---|---|
| Tx | Rx | LTE: Normal GNSS: Interfered |

As will be appreciated, there are challenges to using current state-of-the-art filter technology to address coexistence interference since terminal filters do not provide sufficient rejection on the adjacent channel interference. These challenges are particularly acute in the case of these components configured in a single device where the interference occurs when the LTE component is transmitting on the specified bands. Accordingly, a need exists for improved method, system and device for managing coexistence interference between different radio technologies to overcome the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

A method, system and device are provided for avoiding in-device coexistence interference between different radio technologies deployed on the same device. In selected embodiments, a method and apparatus are provided for estimating and identifying interference from Bluetooth components using Synchronous Connection Oriented (SCO) or Extended Synchronous Connection Oriented (eSCO) links for use in configuring LTE (Long Term Evolution) and BT (Bluetooth) components to provide an in-device coexistence operation mode.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram and flow chart form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Ongoing 3GPP discussions have addressed the technical challenges associated with addressing interference caused by concurrent operation of multiple radio technologies. The difficulties here may be understood with reference to the example of a single device which supports LTE technology with ISM (e.g., Bluetooth and/or WLAN) and/or GNSS technologies which can interfere with one another, such as when the ISM transmitter interferes with the LTE receiver, or when the LTE transmitter causes interference with the ISM and GNSS receiver operations. For example and as reported at the 3GPP report R4-102268 entitled "LS on in-device coexistence interference," the Bluetooth (BT) component error rate is unacceptable when an LTE component is active in some channels of Band 7 or even Band 40 for some BT component channel conditions. Thus, even though there is no degradation to the LTE component, simultaneous operation with the BT component can result in unacceptable disruption in voice services terminating in a BT headset. A similar issue exists when LTE transmissions interfere with GNSS components. Currently, there is no RRM (Radio Resource Management) mechanism for addressing this issue since LTE by itself does not experience any degradation. There are also interference scenarios for the LTE components caused by the non-LTE components. For example and as reported in the 3GPP report R4-102268, the LTE downlink (DL) error rate can be very high (44-55% on PDSCH) when the BT component is active and LTE is deployed in Band 40.

There have been attempts to address the coexistence interference problems using existing radio resource management (RRM) mechanisms and signaling procedures, such as RSRQ (Reference Signal Received Quality) measurement, inter-frequency/inter-RAT handover, cell (re)selection, RLF (Radio Link Failure) monitoring and connection (re)establishment. The main issues and discussions are on 1) how to identify the in-device coexistence interference 2) how to notify the network of in-device coexistence interferences 3) what kind of signaling, operation and procedures are necessary to avoid in-device coexistence interference and 4) how to choose the best way, Frequency Division Multiplexing (FDM) or Time Division Multiplexing (TDM), to avoid in-device coexistence interferences, etc. However, existing procedures require further evaluation to determine if they could handle the coexistence interference and guarantee the required quality of service (QoS). For example, a normal LTE handover procedure using RRC (Radio Resource Control) message exchange is not guaranteed to succeed when there is LTE DL interference since high DL error rates can lead to a DL Radio Link Failure (RLF), which in turn can cause unacceptable problems when the UE attempts to re-establish the connection by accessing another frequency.

One such problem with using existing RRM mechanism is the QoS degradation caused by delay in recovering from RLF which is supposed to be used only in extreme scenarios and is not designed for maintaining QoS guarantee of an on-going connection. Another problem with using existing RRM mechanisms is the ping-pong effect that arises when there is a second handover from the re-established connection at a new frequency channel back to the original frequency channel that was corrupted by the in-device interference. For example, the ping-pong scenario can occur when the desired signal strength on the corrupted channel is higher than the new frequency channel. If handover decisions are based on RSRP-based measurement reports from the UE 10, the ping-pong effect transfers the UE 10 back and forth between the corrupted channel and the desired channel, especially when the coverage is different on different carrier frequencies causing the corrupted channel to be the strongest one. While the ping-pong effect can be avoided if the source eNB 12 uses RSRQ measurements instead of (or in addition to) RSRP to make handover decisions, this would require the eNB 12 to configure all UEs in the cell to use RSRQ measurements since the eNB 12 cannot identify which UEs may be using their ISM radio, leading to additional and undesirable configuration/reporting overhead.

There are additional issues presented by the nature of signaling schemes for non-LTE components. For example, with Bluetooth components, there are two types of packet transmission protocols used—Asynchronous Connection-oriented Link (ACL) and Synchronous Connection-oriented Link (SCO)—which present different co-existence interference challenges because of their differing signaling characteristics. Generally speaking, ACL connections have the following characteristics. First, ACL is the normal type of radio link used for general data packets using a polling TDMA scheme. In addition, ACL supports retransmission if the original transmission is unacknowledged. ACL connections do not have strict QoS requirements so they can be fully retransmitted and postponed. ACL connections also support Forward Error Correction (FEC). In contrast, SCO and enhanced SCO (eSCO) connections are the normal type of radio link used for voice data packets. In addition, SCO links has a set of reserved timeslots on an existing ACL link so that each component transmits encoded voice data in the reserved time slot. While retransmission is supported with eSCO, it is not supported with SCO links. Finally, SCO/eSCO links provide optional FEC support. The main difference between the ACL and eSCO/SCO protocols is the packet transmission time slot position which is either an asynchronous (ACL) or synchronous (SCO) connection. If the application on the BT requires the strict QoS (e.g., voice), SCO would be the best protocol, but if it requires the retransmission and flexible transmission, ACL protocol is used.

Given the SCO link characteristics, the BT master may establish a SCO link to the device and support up to three SCO links, which can be to the same or different slaves. The links are symmetric so that the data rate in each direction is the same and packets are always transmitted on pre-defined time slots, at regular intervals (e.g., every 2, 4 or 6 slots) with 1 slot time in length. FEC is used for the error correction. Table 3 shows the SCO link characteristics.

TABLE 3

SCO link characteristics.

| Type | Slot | Purpose | FEC | Payload | Transmission | Data rate |
|---|---|---|---|---|---|---|
| HV1 | 1 slot | HQ Voice | 1/3 | 10 bytes | Every 2 slots | 64 Kbps |
| HV2 | 1 slot | HQ Voice | 2/3 | 20 bytes | Every 4 slots | 64 Kbps |
| HV3 | 1 slot | HQ Voice | N/A | 30 bytes | Every 6 slots | 64 Kbps |

Since eSCO packets are always transmitted in predetermined time slots, the regular interval between eSCO packets is specified when the link is established. A packet length can be 1 or 3 slot time in length and acknowledged to/from a specific slave. FEC is used for the error correction. Table 4 shows the eSCO link characteristics.

TABLE 4 eSCO link characteristics.

| Type | Slot | Purpose | FEC | Payload | Transmission | Data rate |
|---|---|---|---|---|---|---|
| EV3 | 1 slot | Extended Voice | N/A | Up to 30 bytes | Every 4 slots | 96 Kbps |
| EV4 | 3 slots | Extended Voice | 2/3 | Up to 120 bytes | Every 8 slots | 192 Kbps |
| EV5 | 3 slots | Extended Voice | N/A | Up to 180 bytes | Every 8 slots | 288 Kbps |

Figure 1:
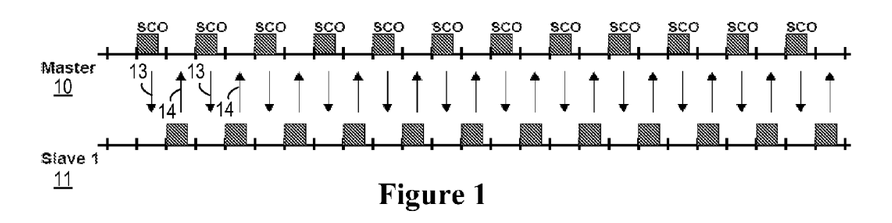
FIG. 1 illustrates SCO HV1 packet transmission timing with one SCO link in a piconet.
Figure 2:
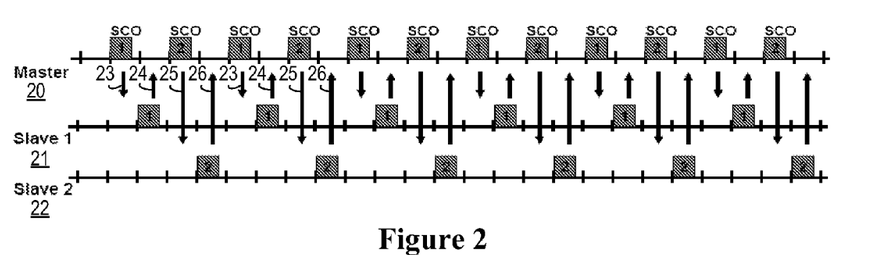
FIG. 2 illustrates SCO HV2 packet transmission timing with two SCO links in a piconet.

To illustrate the differences between SCO and eSCO transmission scheme, reference is made to FIGS. 1 and 2. In FIG. 1, there is shown a packet transmission timing diagram of SCO HV 1 link with one slave 11 in a piconet. As depicted, master 10 and slave 11 nodes are transmitting/receiving the packets 13/14 on the predetermined synchronized time slot at every two time slots. In FIG. 2, there is shown the packet transmission timing diagram of SCO HV2 link with two slaves 21, 22 in a piconet where the master node 20 is transmitting the packets 23, 25 on the pre-determined synchronized time slot at every two time slots, to the different slave nodes 21, 22. With eSCO, the transmissions to the different slave nodes are rotating at every 4 time slots. Therefore, Slave 21 and Slave 22 are receiving 23, 25 and transmitting 24, 26 the packets at every 4 time slots.

A number of contributions, proposals and issues have been proposed to resolve the in-device coexistence problem, but final conclusions have not been reached. For example and as disclosed at 3GPP TR36.816 v1.0.0.1: entitled "Study on signalling and procedure for interference avoidance for in-device coexistence" (Release 10), three different operation modes ("Uncoordinated," "Coordinated within UE only" and "Coordinated within UE and Network") and basic solutions (FDM and TDM) are proposed. In the "Uncoordinated" mode, different components within the same UE operate independently without any internal coordination between different components (LTE, ISM and GNSS). In the "Coordinated within UE only mode," there is an internal coordination between the different components within the same UE, which means that at least the activities of one radio is known by other component's radio, however the eNB is not aware of the coexistence issue possibly experienced by the UE and is therefore not involved in the coordination. In the "Coordinated within UE and with Network mode," different components within the UE are aware of possible coexistence problems and the UE can inform the eNB about such information and problems, so it is then mainly up to the network to decide how to avoid coexistence interference. As proposed, FDM has two different possible solutions, 1) moving LTE signal away from ISM frequency band and 2) moving ISM signal away from LTE frequency band. Based on these potential solutions and modes, some proposals and decisions have been made as a baseline for the initial discussion and study, but only concept and problem in principle have been introduced and captured, and more detail solutions and proposals will be submitted and presented in the future meetings.

FDM Solutions

With FDM solutions, the UE informs the E-UTRAN when transmission/reception of LTE or other radio signal would benefit or no longer benefit from LTE not using certain carriers or frequency resources. With this approach, UE judgment is taken as a baseline approach for the FDM solution, i.e., the UE will indicate which frequencies are (not) useable due to in-device coexistence. The indication can be sent by the UE whenever it has a problem in ISM DL reception it cannot solve by itself. The indication can also be sent by the UE whenever it has a problem in LTE DL reception it cannot solve by itself, and the eNB did not take action yet based on RRM measurements. When LTE UL transmission interferes with ISM/GNSS DL reception, LTE measurements cannot be used to detect the problem and the details of the trigger(s) for the UE to report the problem will probably not be specified in 3GPP. When ISM UL transmission interferes with LTE DL reception, it needs to be determined whether more detailed LTE DL measurement or trigger needs to be specified (e.g., with respect to when to take the measurement in relation to ISM transmissions).

The indication from the UE that a problem occurs can be classified as either reactive (meaning that a problem is reported only when it is detected), or proactive (meaning that potential problems are reported). Reactive indications are supported as the baseline and it is still be determined whether proactive indications, which are not based on LTE DL measurements, should be allowed. Proactive refers to the case that the UE reports that a frequency (serving frequency or candidate frequency) may suffer from unacceptable high interference if the ISM transmitter increases its activity. Proactive indications could be sent in the following two cases: 1) the UE asks the network not to hand itself over to certain of non-serving frequencies that may experience coexistence issues (e.g., due to increase of ISM traffic), or 2) the UE asks the network to change current serving frequency because coexistence problems may become serious due to increased ISM traffic.

The standards groups have not yet determined how this indication is transmitted (e.g., new report, CQI dummy values, dummy RSRP measurement, etc.) and if additional information would be useful to report to enable different handover policies in the eNB based on the actual interferer. The details of E-UTRAN actions upon reception of the assistant information have not been determined yet, but these FDM approaches impose significant overhead costs in generating and processing the indication messages. To address this FDM scenario, selected embodiments of the present invention propose a preferred frequency solution which can reduce overhead.

TDM Solutions

With TDM solutions, it is assumed that SCO, eSCO, A2DP and ACL protocols are supported by in-device BT radio when analyzing the TDM solutions for LTE-BT coexistence. In addition, beacon, power saving and DCF protocols are assumed to be supported by in-device WiFi radio when analyzing the TDM solutions for LTE-WiFi coexistence. For TDM solutions without UE suggested patterns, the UE signals the necessary information (e.g., interferer type, mode and possibly the appropriate offset) in subframes to the eNB. Based on such information, the TDM patterns (i.e., scheduling and unscheduled periods) are configured by the eNB. For TDM solution with UE suggested patterns, the UE suggests the patterns to the eNB, and the eNB must then decide the final TDM patterns. In 3GPP TR36.816 v1.0.0.1, there are two proposed TDM solutions—a Discontinuous Reception (DRX) based solution and H-ARQ process reservation based solution.

In the DRX-based solution, the UE provides the eNB with a desired TDM pattern. For example, the parameters related to the TDM pattern can consist of (1) the periodicity of the TDM pattern, and (2) the scheduled period (or unscheduled period). It is up to the eNB to decide and signal the final DRX configuration to the UE based on UE suggested TDM pattern and other possible criteria (e.g., traffic type). The scheduling period corresponds to the active time of DRX operation, while unscheduled period corresponds to the inactive time. The eNB should try to guarantee the unscheduled period by appropriate UL/DL scheduling, SRS transmission configuration, DRX Command MAC control element usage, etc. During inactive time, the UE is allowed to delay the initiation of dedicated scheduling request and/or RACH procedure.

In H-ARQ process reservation-based solution, a number of LTE HARQ processes are reserved for LTE operation, and the remaining subframes are used to accommodate ISM/GNSS traffic. To address this TDM scenario, selected embodiments of the present invention propose using eSCO/SCO protocols in the interference detection and identification methods for the configuration of LTE and BT components, though it will be appreciated that the proposal applies to FDM solutions as well.

Keeping Time for Handover

Another approach for managing in-device coexistence interference is to establish a "keeping time" parameter as part of a coexistence mode handover procedure so that a non-interfering network node does not switch back to an interfering network node after handoff to improve the performance of handover operation. In operation, the UE triggers and transmits a measurement reporting message with "Keeping Time" and "Reason IDC (In-device Coexistence)" when it experiences interference due to in-device coexistence, and then initiates handover procedures such as inter-RAT or inter-frequency to avoid undesirable interferences from non-LTE components. After handover completion, LTE and non-LTE components could work together without mutual interference. In addition, the target eNB (T-eNB) is prevented from instructing the UE to handover back to the previous frequency of the source eNB (S-eNB)/Cell for the Keeping Time duration. During the Keeping Time, the UE may not trigger measurement reporting or the UE may exclude the frequency from the previous S-eNB/Cell for the measurement reporting. But after the Keeping Time expires, the T-eNB may instruct the UE to handover back to the previous frequency of the S-eNB/cell if the non-LTE component has been disabled, possibly resulting in interference at the UE if the non-LTE component has not been disabled. To address the possibility of premature handover, selected embodiments of the present invention propose signaling, procedures and information elements for extending the Keeping Time initially indicated to the T-eNB through the S-eNB based on the request from the UE in order to protect undesirable interferences or ping-pong problem.

To address the coexistence interference problems and limitations from existing solutions, there are disclosed herein techniques for identifying interference for the configuration of LTE and BT with eSCO/SCO, as well as signaling and information elements for updating the Keeping Time on the in-device coexistence platform in which potentially conflicting signaling operations are separated from one another.

Interference Identification on the Configuration of LTE and BT

In selected embodiments, in-device coexistence interference from Bluetooth components is identified on the basis of the synchronous signal transmission characteristics of the eSCO/SCO protocol used by BT components. From the point of view of the LTE component on the same platform, the signals from BT component could be assumed as a noisy signal with a periodic time and similar threshold level of the power of the signals. Based on these characteristics of BT signal, LTE component is able to estimate and identify the interference whether it is coming from due to in-device coexistence or local interferences by using an existing Received Signal Strength Indicator (RSSI) measurement approach or a new measurement approach.

Approach 1: Using Existing RSSI Measurement to Identify BT Interference

In selected embodiments where a BT component in the in-device coexistence platform is enabled, the UE may be configured to measure RSSI every X subframes (where X is configured by the eNB) and then send an in-device coexistence indicator to a higher layer if measured RSSI is larger than a predetermined threshold. In these embodiments, it will be appreciated that the measurement of the received signal corresponds to the Received Signal Strength Indicator (RSSI) measurement defined in 3GPP TS36.214 entitled "Evolved Universal Terrestrial Radio Access (E-UTRA); Physical layer, Measurements" (Rel-8).

Figure 3:
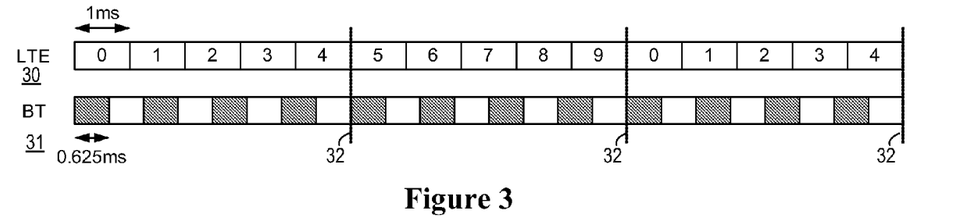
FIG. 3 illustrates an example timing relationship between LTE and BT transmissions whereby the UE is able to detect the interference correctly from BT component by periodically measuring a Received Signal Strength Indicator.

According to the RSSI definition, the UE measures RSSI on OFDM symbol containing reference symbols for antenna port 0. However, as shown in FIG. 3 with the comparative timing relationship between LTE and BT transmissions, the subframe duration is 1ms in LTE 30 and the slot duration is 0.625 ms in BT 31. Since the LTE and BT have different subframe/slot duration, RSSI in some of subframes would imply the interference from BT. The BT measurement subframe can be defined as a LTE subframe in which BT interference can be correctly measured because LTE subframe and BT slots are overlapped. As shown in FIG. 3, the UE is able to detect the interference correctly from BT component every 5 ms 32 by measuring RSSI, and these subframes can be considered as the BT measurement subframe. If the UE measures BT interference every 5 ms (i.e. 8 slots), this will cover most of the packet periodicity described in Table 3 and 4, and will reduce the UE complexity.

Alternatively, LTE UE can determine the BT measurement subframe as any subframe in which BT slot is overlapped with OFDM symbol containing reference symbols for antenna port 0. This approach would be beneficial when the timing of LTE and BT subframe may not be synchronized.

If the power level exceeding a threshold is measured within the BT measurement subframe at RSSI, the UE may be able to assume that the interference comes from the BT component. Accordingly, the lower layer indicates BT inference existence to high layers. Depending on RSSI measurement implementation, RSSI may be averaged over the multiple subframes. Since it may be difficult to detect BT interference if interference averaging is done over both BT measurement subframes and non-BT measurement subframes, measurement accuracy may be increased by using instantaneous RSSI measurement to detect BT interference. Alternatively, the interference averaging can be also restricted within BT measurement subframes.

The power level of a threshold can be defined with a fixed value or the variable level based on the maximum permitted power of the BT component. In order to increase the accuracy, the UE can compare RSSI values between the BT measurement subframe and non-BT measurement subframe which is not included as BT measurement subframe. If the comparison difference is higher than a predetermined threshold, this signals that there is interference from the BT. Alternatively, the UE could only measure the RSSI values during the BT measurement subframes and compare the measured RSSI values with the normal UE RSSI measurements measured in any subframe since the UE would perform the normal RSSI measurements without restriction. Therefore, it is not necessary to measure the RSSI values during the non-BT measurement subframes.

From the UE side, the UE first identifies the BT measurement subframes, and then performs the RSSI measurements over this set of the subframes besides its normal RSSI measurements. The UE then compares these two values and if the comparison difference is above a predeteremined threshold value, then BT interference existence is indicated. In selected embodiments, the averaging period and the threshold value could be pre-configured in the UE or set by the networks. Further, as shown in Table 3 and Table 4, there are six different transmission modes in eSCO/SCO link protocols. To improve the accuracy of measurement, the LTE component is able to perform RSSI measurement in the multiple BT measurement subframe set of which one is associated to each transmission mode defined.

Approach 2: Using a New Measurement to Identify BT Interference

The use of existing RSSI measurements to identify BT interference is relatively simple to implement since does not require modification of the current RSSI measurement method. However, by using RSSI measurements, the UE can only detect BT interference when the BT slot is overlapped with OFDM symbol containing reference symbols for antenna port 0. In order to perform the faster and more reliable detection, selected embodiments of the present invention provide a new measurement and identification method for the received signal which uses a Bluetooth-RSSI (BT-RSSI) measurement as a received signal strength indicator to identify the source of interference. As disclosed, the BT-RSSI measurement may include other interferences from neighbor cells, although it may not be possible to distinguish the exact origin of each received signal in UE reception.

Figure 4:
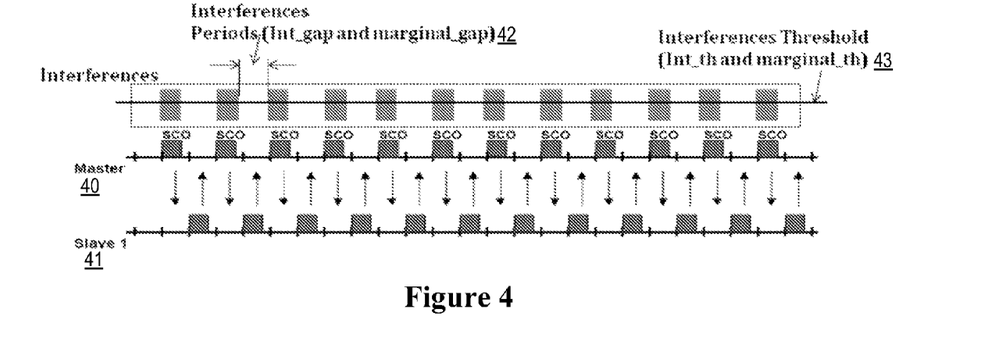
FIG. 4 shows the BT-RSSI measurement based on the packet transmission of the BT.

To illustrate an example embodiment of the new measurement scheme, reference is now made to FIG. 4 which shows the BT-RSSI measurement based on the packet transmission of the BT component. As depicted, the BT master device 40 is transmitting at the pre-determined time slot having a defined periodicity. This transmission from the master node 40 to the slave node 41 will interfere with the LTE component if the LTE component is in reception mode. In addition, a periodic packet transmission could be interpreted as periodic interference occurrences to the LTE component. The LTE component measures the BT-RSSI using the measurement window which is defined as one slot time to measure the interference during the packet period. This approach is beneficial in cases where the timing of the LTE and BT components is not aligned in frame boundary. In operation, the LTE component moves the measurement window, T_shift, to detect the existence of BT interference. To correctly detect the peak BT-RSSI, the measurement window T_shift may need to be smaller than BT slot (i.e., 1 slot). Alternatively, the duration of the window can be 3 slots to be optimized for the case of using 3 slots for transmission in eSCO link.

To identify whether the interference is coming from the BT component or not, there are disclosed herein signaling parameters for BT-RSSI periods 42 and power level 43 of the threshold. First, the "BT-RSSI periods" parameter 42 defines the period between two BT-RSSI peaks coming from two sequential packet transmissions. In an example embodiment, BT-RSSI periods=Int_gap+/−Marginal_gap, where "Int_gap" is a BT-RSSI time gap, and "Marginal_gap" is a time adjustment between two BT-RSSI peaks(noises).

A second "BT-RSSI threshold" parameter 43 defines the power level of threshold of the BT-RSSI peak. In an example embodiment, BT-RSSI Threshold=Int_th+/−Marginal_th, where "Int_th" is the maximum permitted Tx power with margins, "Marginal_th" is a power level of threshold adjustment, and "Int_th_off" is a power level of the off-time of BT traffic.

By measuring multiple timing instances with the measurement window, the LTE component can find the peak BT-RSSI level and detect interference from the BT component if multiple peaks having the regular pattern are detected. To this end, the UE first checks if the power level of BT-RSSI peak is larger than the BT-RSSI threshold. If the peak BT-RSSI level is larger than a predetermined threshold and the timing gap of two consecutive peaks are matched up with the periods of interference defined with Int_gap and Marginal_gap, the UE decides it is interference from the BT and indicates BT interference existence to high layers. In other embodiments, a "power level of off-peak" parameter could be used as another detection parameter because peak and off-peak BT-RSSI are alternatively detected due to the BT transmission pattern. Once the peak BT-RSSI level is detected in one measurement duration, the BT-RSSI level in the next duration can be expected as the minimum interference level (off-peak interference). To increase the detection accuracy, the LTE component can use the power level of off-peak interference to identify the source of interference, using comparison of peak and off-peak BT-RSSI level. If the LTE and BT components are aware of the configuration with internal communication, the measurement can be achieved without measurement window every BT slot, which is the peak of BT-RSSI.

Referring to FIG. 4, the interference periods are defined with reference to an interference time gap (Int_gap) that is fixed and synchronized in the SCO link protocol. As a result, the BT-RSSI measurement can be periodically performed. If there is no neighbor and local noise, the interference time gap would be the accurate interference period for measuring periodic noise. However, to account for the time adjustment between BT-RSSI peaks (which might be BT packets), a marginal gap (marginal_gap) may also be defined. In addition, an interference threshold is provided. In selected embodiments, the interference power level of threshold (Int_th) could be different according to the BT configuration and possible range of coverage. For example, Table 5 (below) shows the different power level of threshold for each class of BT. In most cases, the effective range of class 2 devices is extended if they connect to a class 1 transceiver, compared to a pure class 2 network. However, as shown in Table 5, the power level of threshold could be set differently for different classes. Based on the maximum permitted power, the interference could be measured periodically with the specified power of level. If there is no neighbor and local noise, the interference threshold (Int_th) would be the accurate power of level of the signal, but to account for the power adjustment between noisy pulses (packets), a marginal threshold (marginal_th) may also be defined.

TABLE 5

| | Class of BT | | |
|---|---|---|---|
| | Maximum Permitted Power | | Range |
| Class | mW | dBm | (Approximate) |
| Class 1 | 100 | 20 | Up to 100 meters |
| Class 2 | 2.5 | 4 | Up to 10 meters |
| Class 3 | 1 | 0 | Up to 1 meters |

Proposed BT Interference Identification Module

Figure 5:
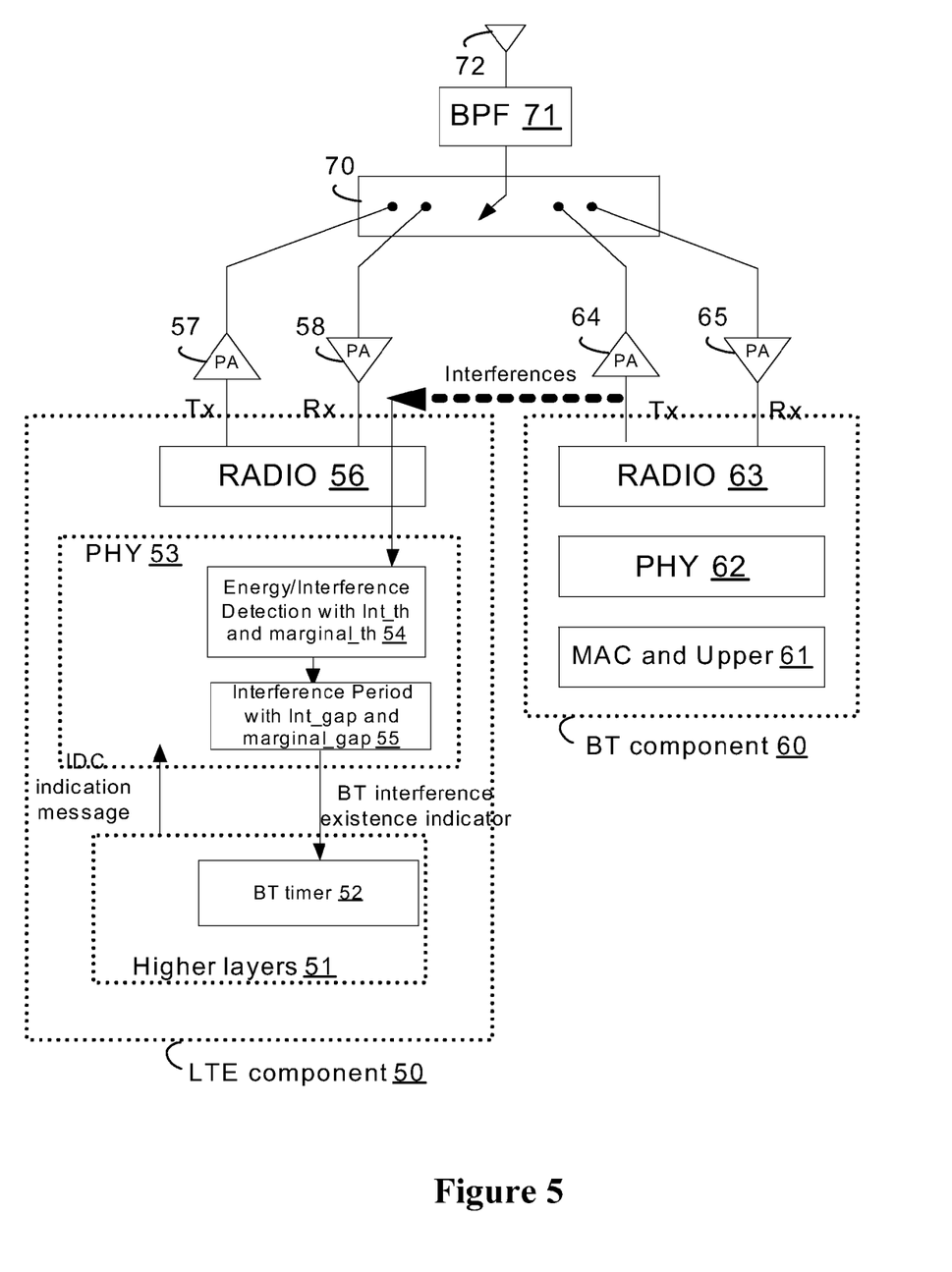
FIG. 5 illustrates a functional block diagram of an interference and detection and decision module which identifies interference from the in-device coexistence systems which have LTE component and BT component.

Turning now to FIG. 5, there is depicted functional block diagram of an interference detection and decision module for identifying the interference that comes from the in-device coexistence systems which have an LTE component 50 and a BT component 60 using the new BT-RSSI measurement. As depicted, each component 50, 60 shares a bandpass filter switch and antenna 70-72, and has its own RF chain and protocol blocks, such as transmit/receive power amplifiers 57/58, 64/65, Radio 56/63, PHY 53/62, higher layers 51/61 (e.g., MAC and RRC layer), although the LTE component 50 has additional functional blocks 54, 55 to detect the received signal and identify whether the received signal is larger than the threshold periodically. The LTE component 50 can identify the interferences using an energy or interference detection method once the non-LTE component 60 generates the interferences (e.g., packet) from its Tx RF module. For interference detection and identification, the LTE PHY 53 uses the defined interference period and threshold parameters. In particular, the LTE component 50 uses the first functional block 54 to recognize the power level of the higher received signal coming from non-LTE component, BT 60. At the second functional block 55, the LTE component 50 measures the period of the received signal with Int_gap and marginal_gap parameters. With this detection scheme, a BT component 60 using eSCO/SCO generates the signal with a flat power level and periodicity. Based on the measured parameters (e.g., Int_th, marginal_th, Int_gap and marginal_gap), the LTE component 50 is able to make a decision whether the interference comes from the BT component.

Upon determining that the interference comes from the BT component, the LTE component 50 sends the indicator with BT interference existence to the higher layers 51. To avoid the false detection, the higher layers 51 apply the BT timer (T_bt) or the counter (N_bt) 52. Therefore, if the higher layers 51 receive BT interference existence indicators consecutively during T_bt or more than N_bt, the higher layers 51 generate the message which is the in-device coexistence interference indication message and send the message to the eNB. Alternatively, the false detection is completed in the low layer which means only when the low layer determines that the BT interference occurs for certain duration, then an indicator will be sent to high layers and a message will be generated. Upon receiving the indication message, the eNB may be configured to perform proper actions to assist the UE with avoiding the interferences, such as by applying appropriate FDM or TDM solutions. The timer is started if the first BT interference existence indicator is received after the timer is expired. T_bt or N_bt can be predetermined or configured by eNB. To make the signaling faster and efficient, a new MAC CE could be defined for the BT interference indicator or some existing reserved bits of other MAC CE could be used for this purpose. This could be also transmitted as an IE inside other RRC messages. In other embodiments, a L3 filter can also be applied to the measurement results for each measurement period and then compared to a predetermined threshold. If the comparison result is larger for consecutive N_bt, then the indication is sent to a higher layer.

When the UE is not scheduled for DL or in non-active time of DRX mode, the UE may be configured to refrain from measuring interference or sending indication messages in order to save power consumptions and to avoid undesirable signaling. In addition, the eNB may request the identification-related parameters and the configuration status of the in-device coexistence from the UE in order to allocate the proposer identification parameters. The procedures could be achieved with the existing RRC signaling message such as UEInformationRequest message such as defined hereinbelow.

By now it should be appreciated that there is disclosed herein a method for use in a radio access network (eNB) by user equipment (UE) having a first radio technology component (e.g., an LTE component) and a second radio technology component (e.g., a GNSS or ISM) on a single platform. In the disclosed system and methodology, a method for identifying interference of a Bluetooth component is provided which uses an existing RSSI measurement or predetermined measurement parameters (e.g., Int_gap, Marginal_gap, Int_th, Marginal_th and Int_th_off) to identify the interferences from the Bluetooth component. In addition, a scheme is provided for using predetermined measurement parameters, N_bt and T_bt, for identifying the interferences and generating the indication message. There is also provided an interference detection and decision module with proposed parameters for identifying the interferences from the BT component.

Figure 6:
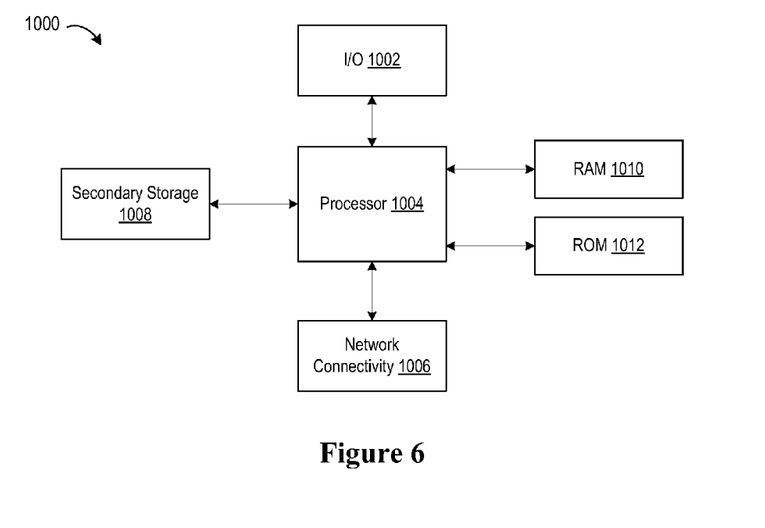
FIG. 6 illustrates an example computer system that may be suitable for implementing the in-device coexistence interference at a user device or network node.

The user device and network elements described herein may include any general or special purpose computer with sufficient processing power, memory resources, and network throughput capability to handle the necessary workload placed upon it. FIG. 6 illustrates an example computer system 1000 that may be suitable for implementing one or more embodiments disclosed herein. The computer system 1000 includes a processor 1004 (which may be referred to as a central processor unit or CPU) that is in communication with input/output (I/O) devices 1002, network connectivity devices 1006, an optional secondary storage 1008, random access memory (RAM) 1010, and read only memory (ROM) 1012. The processor may be implemented as one or more CPU chips.

The secondary storage 1008 is optionally included, and typically includes one or more disk drives or tape drives used for non-volatile storage of data and/or for over-flow data storage device if RAM 1010 is not large enough to hold all working data. Secondary storage 1008 may be used to store programs which are loaded into RAM 1010 when such programs are selected for execution. The ROM 1012 is used to store instructions and perhaps data which are read during program execution. ROM 1012 is a non-volatile memory device which typically has a small memory capacity relative to the larger memory capacity of secondary storage. The RAM 1010 is used to store volatile data and perhaps to store instructions. Access to both ROM 1012 and RAM 1010 is typically faster than to secondary storage 1008.

I/O devices 1002 may include on or more printers, video monitors, liquid crystal displays (LCDs), touch screen displays, keyboards, keypads, switches, dials, mice, track balls, voice recognizers, card readers, paper tape readers, or other well-known input devices.

The network connectivity devices 1006 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 1006 devices may enable the processor 1004 to communicate with an Internet or one or more intranets. With such a network connection, it is contemplated that the processor 1004 might receive information from the network, or might output information to the network in the course of performing the above-described method steps. Such information, which is often represented as a sequence of instructions to be executed using processor 1004, may be received from and outputted to the network, for example, in the form of a computer data signal embodied in a carrier wave or a non-transitory computer readable storage medium, such as RAM, ROM or other memory storage devices.

Such information, which may include data or instructions to be executed using processor 1004 for example, may be received from and outputted to the network, for example, in the form of a computer data baseband signal or signal embodied in a carrier wave. The baseband signal or signal embodied in the carrier wave generated by the network connectivity 1006 devices may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 1004 executes instructions, codes, computer programs, scripts which it accesses from hard disk, floppy disk, optical disk (these various disk-based systems may all be considered secondary storage 1008), ROM 1012, RAM 1010, or the network connectivity devices 1006. While only one processor 1004 is shown, multiple processors may be present. Thus, while instructions may be discussed as executed by a processor, the instructions may be executed simultaneously, serially, or otherwise executed by one or multiple processors. In addition or in the alternative, any required processing functionality may be executed by a cryptographic engine or other hardware accelerator circuit (not shown).

Figure 7:
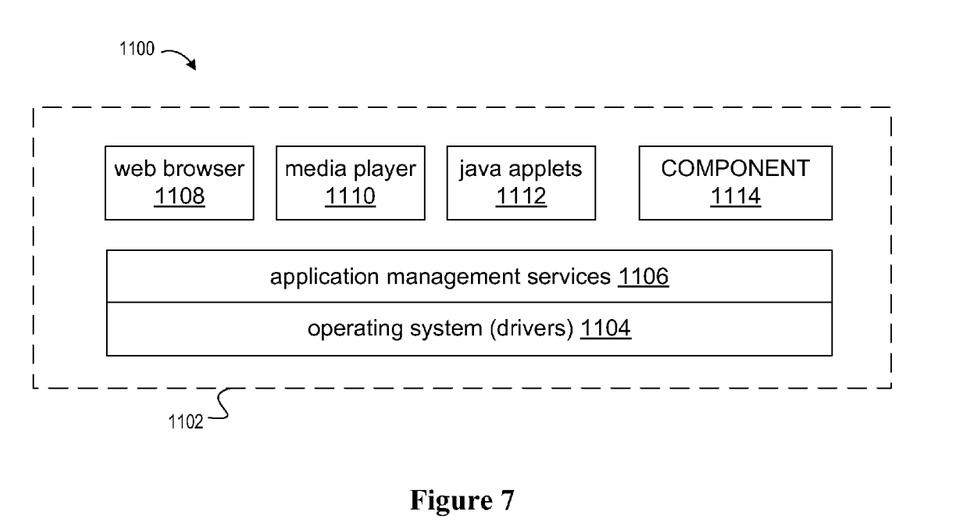
FIG. 7 is a diagram of a software environment that may be implemented on a user agent and/or network node operable for some of the various embodiments of the disclosure.

FIG. 7 is a diagram of a software environment 1100 that may be implemented on a communication device and/or network node operable for some of the various embodiments of the disclosure. As illustrated, one or more processing resources at the communication device or network node execute operating system drivers 1104 that provide a platform from which the rest of the software operates. The operating system drivers 1104 provide drivers for the device hardware with standardized interfaces that are accessible to application software. The operating system drivers 1104 include application management services ("AMS") 1106 that transfer control between applications running on the device. In UE instances, the software environment 1102 includes a web browser application 1108, a media player application 1110, and Java applets 1112 are provided as device applications. The web browser application 1108 configures the UE device to operate as a web browser, allowing a user to enter information into forms and select links to retrieve and view web pages. The media player application 1110 configures the UE to retrieve and play audio or audiovisual media. The Java applets 1112 configure the UE device to provide games, utilities, and other functionality. Finally, the component 114 may provide the in-device coexistence interference management functionality described herein.

Figure 8:
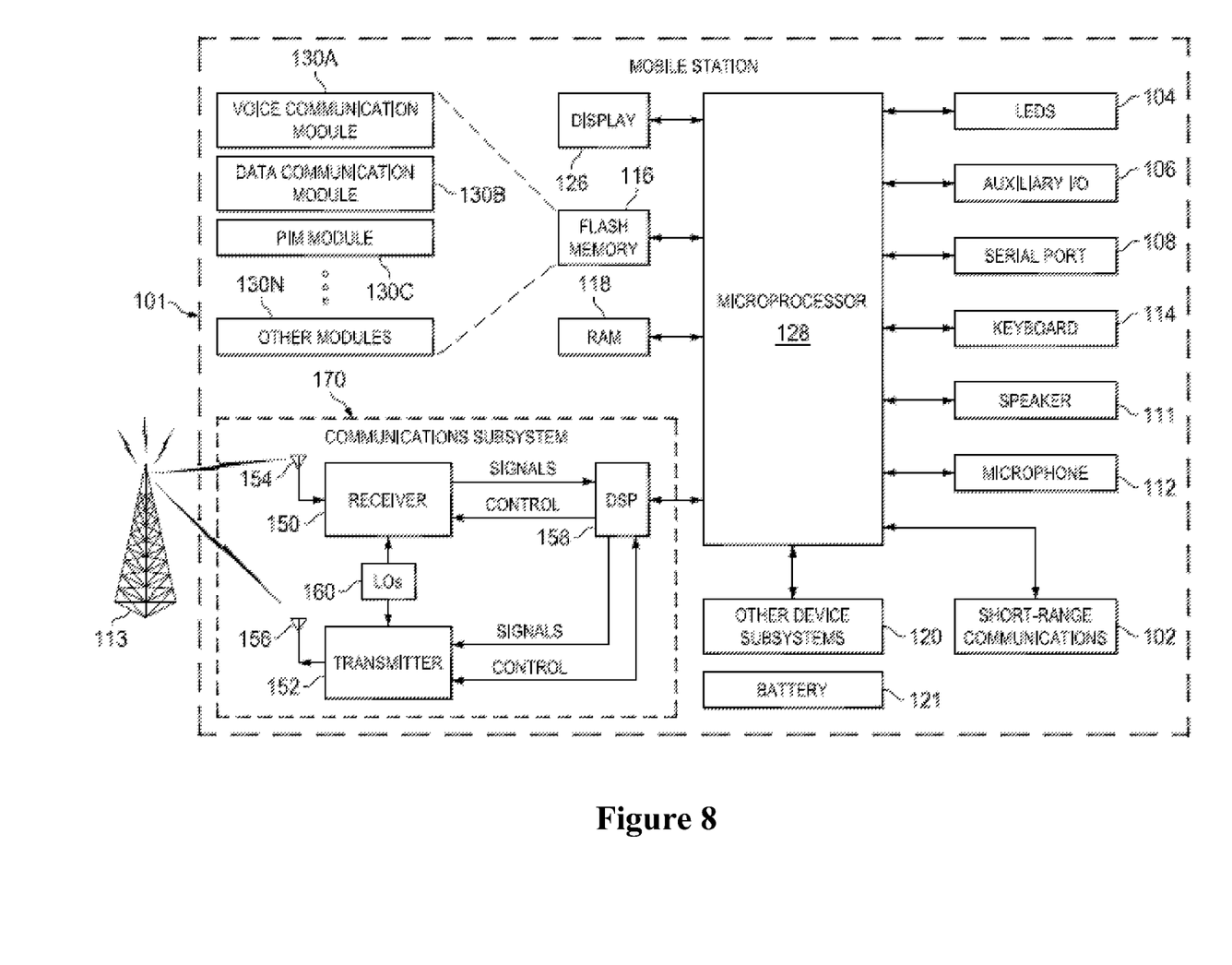
FIG. 8 is a schematic block diagram illustrating exemplary components of a mobile wireless communications device which may be used with selected embodiments of the present invention.

Referring now to FIG. 8, there is shown a schematic block diagram illustrating exemplary components of a mobile wireless communications device 101 which may be used with selected embodiments of the present invention. The wireless device 101 is shown with specific components for implementing features described above. It is to be understood that the wireless device 101 is shown with very specific details for exemplary purposes only.

A processing device (e.g., microprocessor 128) is shown schematically as coupled between a keyboard 114 and a display 126. The microprocessor 128 controls operation of the display 126, as well as overall operation of the wireless device 101, in response to actuation of keys on the keyboard 114 by a user.

The wireless device 101 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 101 are shown schematically. These include a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 101 may have a battery 121 to power the active elements of the wireless device 101. The wireless device 101 is in some embodiments a two-way radio frequency (RF) communication device having voice and data communication capabilities. In addition, the wireless device 101 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 101 may also be stored to the RAM 118.

The microprocessor 128, in addition to its operating system functions, enables execution of software applications on the wireless device 101. A predetermined set of software applications that control basic device operations, such as a voice communications module 130A and a data communications module 130B, may be installed on the wireless device 101 during manufacture. In addition, a personal information manager (PIM) application module 130C may also be installed on the wireless device 101 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 includes a processing module, such as a digital signal processor (DSP) 158, and local oscillators (LOs) 160. In some embodiments, the communication subsystem 170 includes a separate antenna arrangement (similar to the antennas 154 and 156) and RF processing chip/block (similar to the Receiver 150, LOs 160 and Transmitter 152) for each RAT, although a common baseband signal processor (similar to DSP 158) may be used for baseband processing for multiple RATs. The specific design and implementation of the communication subsystem 170 is dependent upon the communication network in which the wireless device 101 is intended to operate. For example, the communication subsystem 170 of the wireless device 101 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 170 may also be designed to operate with an 802.11 Wi-Fi network, and/or an 802.16 WiMAX network. Other types of data and voice networks, both separate and integrated, may also be utilized with the wireless device 101.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 101 may send and receive communication signals over the communication network 113. Signals received from the communication network 113 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 113 are processed (e.g., modulated and encoded) by the DSP 158 and are then provided to the transmitter 152 for digital to analog conversion, frequency up conversion, filtering, amplification and transmission to the communication network 113 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 113 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 101. In addition, the display 126 may also be utilized in voice communication mode, for example, to display the identity of a calling party, the duration of a voice call, or other voice call related information.

The short-range communications subsystem 102 enables communication between the wireless device 101 and other proximate systems or devices, which need not necessarily be similar devices. For example, the short range communications subsystem may include an infrared device and associated circuits and components, or a Bluetooth™ communication module to provide for communication with similarly-enabled systems and devices.

By now it should be appreciated that there is disclosed herein a method for use in a radio access network (eNB) by user equipment (UE) having a first radio technology component (e.g., an LTE component) and a second radio technology component (e.g., a GPS or ISM) on a single platform. In the disclosed system and methodology, a user equipment device identifies interference from a BT component based on predetermined signal characteristics of the eSCO/SCO protocol. In addition, a computer program product is disclosed that includes a non-transitory computer readable storage medium having computer readable program code embodied therein with instructions which are adapted to be executed to implement a method for operating user equipment (UE) and/or a radio access network (eNB) in a coexistence mode, substantially as described hereinabove.

There is also disclosed herein a method for identifying Bluetooth interference in user equipment (UE) having first and second radio technology components on a single platform, where the first radio technology component may be an LTE component and the second radio technology component may be a BT component. In the disclosed methodology, signal interference at the first radio technology component is detected and measured as received signal power at predetermined time intervals to generate a plurality of measurement values corresponding to BT SCO or eSCO transmission, such as by measuring RSSI at predetermined time intervals corresponding to a predetermined SCO or eSCO transmission mode being used by the second radio technology component. In selected embodiments, the received signal power is measured by processing the signal interference at the first radio component to identify a synchronous transmission pattern using one or more interference identification parameters which may be received at the UE as system parameters from a network node. The identification-related parameters and configuration status may be requested in a Radio Resource Control (RRC) message (e.g., UEInformationRequest) by an eNB in order to allocate the one or more interference identification parameters. For example, the received signal power is measured by measuring an RSSI at predetermined subframes (e.g., every RSSI subframe configured by the network when the second radio technology component is enabled, or every subframe which is overlapped with a Bluetooth transmission slot) on OFDM symbol containing reference symbols at a predetermined antenna port. If the plurality of measurement values exceeds a threshold power level value, an in-device coexistence indicator message is sent from the first radio component to a higher layer to indicate SCO or eSCO interference from the second radio component. Alternatively, the in-device coexistence indicator message is sent if an average of multiple measurement values taken at predetermined time intervals exceeds the threshold power value which may be fixed or variable based on a transmission class for the second radio technology component. In some embodiments, the received signal power is measured by measuring RSSI values in BT measurement subframes and non-BT measurement subframes, and then comparing RSSI values between the BT measurement subframe and non-BT measurement subframe to compute a difference value so that the in-device coexistence indicator message is sent if the difference value exceeds a predetermined threshold value. In this arrangement, BT measurement subframes are the subframes which are overlapped with BT transmission slots, while non-BT measurement subframes are the subframes which are not included in BT measurement subframes. In other embodiments, the received signal power is measured by measuring RSSI values in BT measurement subframes, comparing RSSI values between the BT measurement subframe and normal UE RSSI measurements measured in any subframe to compute a difference value, and sending the in-device coexistence indicator message if the difference value exceeds a predetermined threshold value.

According to other embodiments, the disclosed methodology measures the received signal power by processing the signal interference at the first radio component to identify a synchronous transmission pattern using a predetermined power threshold value and periodicity value to generate the plurality of measurement values corresponding to a BT SCO or eSCO transmission as E-UTRA Carrier Received Signal Strength Indicator (RSSI) measurement values. In these embodiments, the E-UTRA Carrier RSSI measurement values measure a linear average of total received power observed during a predetermined Bluetooth time slot in a specified measurement bandwidth over N number of resource blocks from all sources. As disclosed, either or both the predetermined power threshold value and periodicity value may be received at the UE as system parameters from a network node. In addition, the predetermined power threshold value may be variable based on a transmission class for the second radio technology component, and can be computed as a combination of a maximum permitted transmit power value and a marginal threshold adjustment value (e.g., plus or minus a marginal threshold adjustment value) that are configured by one or more higher layers. Likewise, the periodicity value may be computed as a combination of a fixed interference time gap value plus or minus a marginal adjustment time gap value. With this approach, the received signal power at the first radio component is measured over consecutive Bluetooth time slots to identify a plurality of peak signals which each exceed a predetermined power threshold value, such as applying an adjustable measurement window at the first radio component to measure the received signal power at predetermined time intervals. In this way, each peak received signal may be identified as a Bluetooth Received Signal Strength Indicator (RSSI) when transmission timing between the first and second radio technology components is not coordinated. In addition, the time gap between two consecutive peak signals is measured, and a determination is made if the time gap corresponds to an SCO transmission or eSCO transmission. In selected embodiments, the determination is made by computing an adjustable reference gap value corresponding to an SCO transmission or eSCO transmission as a combination of a fixed interference time gap and a marginal adjustment time gap configured by higher layer(s), and then determining if the adjustable reference gap value matches the time gap. For additional accuracy, the received signal power measurement may also measure the received signal power at the first radio component over consecutive Bluetooth time slots to identify a plurality of off-peak signals adjacent to the plurality of peak signals. To query the UE status, an E-UTRAN network node sends a UEInformationRequest message which includes an In-DeviceCoexistenceReq information element to determine if the UE has requested an in-device coexistence operation mode due to detected Bluetooth interference.

In addition, there is also disclosed a UE device and method of operating first and second radio technology components on a shared UE platform. As disclosed, the UE device includes one or more antennas for transmitting and receiving one or more signals, an LTE component having a plurality of RF protocol layers, and a BT component having a plurality of RF protocol layers. The UE also includes processor control logic and/or circuitry configured to identify Bluetooth interference at the LTE component caused by the BT component by detecting signal interference and measuring received signal power at the LTE component at predetermined time intervals to generate a plurality of measurement values corresponding to a BT SCO or eSCO transmission. To this end, the processor control logic and/or circuitry includes an interference detection module (which identifies the plurality of measurement values which exceed a power threshold value) and an interference decision module (which identifies the plurality of measurement values which satisfy a periodicity value). In selected embodiments, the power threshold value may be computed as a combination of a maximum permitted transmit power value and a marginal threshold adjustment value which may be configured by one or more higher layers. In other embodiments, the periodicity value may be computed as a combination of a fixed interference time gap and a marginal adjustment time gap which may be configured by one or more higher layers. In addition, the processor control logic and/or circuitry is configured to send an in-device coexistence indicator message from the first radio component if the plurality of measurement values exceed a threshold power level value to indicate SCO or eSCO interference from the second radio component.

In yet another form there is disclosed a computer program product implemented as a non-transitory computer readable storage medium having computer readable program code embodied therein that is adapted to be executed to implement a method for identifying Bluetooth interference in user equipment (UE) having first and second radio technology components on a single platform. As disclosed, the computer program product includes instructions for detecting signal interference and measuring received signal power at the first radio technology component at predetermined time intervals to generate a plurality of measurement values corresponding to a Bluetooth Synchronous Connection Oriented (SCO) transmission or Extended Synchronous Connection Oriented (eSCO) transmission. In addition, the computer program product includes instructions for sending an in-device coexistence indicator message from the first radio component if the plurality of measurement values exceed a threshold power level value to indicate SCO or eSCO interference from the second radio component.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Numerous modifications and variations of the present application are possible in light of the above teachings. It is therefore to be understood that within the scope of the appended claims, the embodiments of the application may be practiced otherwise than as specifically described herein.

Although the described exemplary embodiments disclosed herein are described with reference to a coexistence operation mode whereby different signaling components are separated in time to avoid coexistence interference, the present invention is not necessarily limited to the example embodiments which illustrate inventive aspects of the present invention that are applicable to a wide variety of signaling schemes and applications. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

APPENDIX

This appendix sets forth proposed changes to selected 3GPP TS reports and specifications that relate to the management and avoidance of in-device coexistence interference.

APPENDIX

| TS 36.213 - Modification for Using Existing RSSI Measurement for BT Interference Identification |
|---|
| =====================================Begin of Change=====================================<br>11 UE procedure for BT identification<br>When BT component in the in-device coexistence is enabled, the UE shall measure RSSI every X subframe , where X is configured by eNB. The UE sends the in-device coexistence indicator to higher layer if measured RSSI is larger than the threshold.<br>=====================================End of Change===================================== |

| TS 36.214 - Change for Using New Measurement for BT Interference Identification |
|---|
| =====================================Begin of Change=====================================<br>5.1.xBT-RSSI (Bluetooth-RSSI)<br>Definition    E-UTRA Carrier Received Signal Strength Indicator (RSSI), comprises the linear average of the total received power (in [W]) observed during BT slot (0.625ms), in the measurement bandwidth, over N number of resource blocks by the UE from all sources, including co-channel serving and non-serving cells, adjacent channel interference, thermal noise etc. When E-UTRA UE is not aware of the exact timing of BT slot, E-UTRA UE assumes a peak received signal as BT-RSSI. The reference point for the RSRQ shall be the antenna connector of the UE. If receiver diversity is in use by the UE, the reported value shall not be lower than the corresponding RSRQ of any of the individual diversity branches.<br>Applicable for    RRC_CONNECTED intra-frequency,<br>    RRC_CONNECTED inter-frequency<br>=====================================End of Change===================================== |

| TS 36.213 - Change for Using New Measurement for BT Interference Identification |
|---|
| =====================================Begin of Change=====================================<br>11 UE procedure for BT identification<br>When the BT component in the in-device coexistence is enabled, the UE shall measure BT-RSSI every BT slot. If a time gap of two consecutive BT-RSSIs having the range of Int_th +/− Marginal_th is matched into Int_gap +/− Marginal_gap, the physical layer in UE sends the in-device coexistence indicator to higher layer. Int_th, Marginal_th, Int_gap and Marginal_gap are configured by higher layers.<br>=====================================End of Change===================================== |

| TS 36.331 - Change for UEInformationRequest Commmand |
|---|
| =====================================Begin of Change=====================================<br>UEInformationRequest<br>The UEInformationRequest is the command used by E-UTRAN to retrieve information from the UE.<br>    Signalling radio bearer: SRB1<br>    RLC-SAP: AM<br>    Logical channel: DCCH<br>    Direction: E-UTRAN to UE<br>                            UEInformationRequest message<br>-- ASN1START<br>UEInformationRequest-r9          ::=                  SEQUENCE {<br>    rrc-TransactionIdentifier          RRC-TransactionIdentifier,<br>    criticalExtensions                CHOICE {<br>        c1                            CHOICE {<br>            ueInformationRequest-r9            UEInformationRequest-r9-IEs,<br>            spare3 NULL, spare2 NULL, spare1 NULL<br>    },<br>    criticalExtensionsFuture              SEQUENCE {} |

APPENDIX-continued

```
   }
}
UEInformationRequest-r10            ::=              SEQUENCE {
   Rrc-TransactionIdentifier                RRC-TransactionIdentifier
   CriticalExtensions                       CHOICE {
      C1                                       CHOICE {
         ueInformationRequest-r9                    UEInformationRequest-r9-IEs,
         spare3 NULL, spare2 NULL, spare1 NULL
      },
      criticalExtensionsFuture                 SEQUENCE {}
UEInformationRequest-r9-IEs          ::=       SEQUENCE {
   rach-ReportReq-r9                                BOOLEAN,
   rlf-ReportReq-r9                                 BOOLEAN,
   nonCriticalExtension                             UEInformationRequest-v930-IEs
   OPTIONAL
}
UEInformationRequest-r10-IEs         ::=            SEQUENCE {
   In-DeviceCoexistenceReq-r9                          BOOLEAN,
   nonCriticalExtension                           UEInformationRequest-v100-IEs
   OPTIONAL
}
UEInformationRequest-v930-IEs        ::=    SEQUENCE {
   lateR9NonCriticalExtension           OCTET STRING                    OPTIONAL,   --
Need OP
   nonCritical Extension                SEQUENCE {}                     OPTIONAL    --
NeedOP
}
UEInformationRequest-v100-IEs        ::=    SEQUENCE {
   lateR10NonCriticalExtension          OCTET STRING                    OPTIONAL,   --
Need OP
   nonCriticalExtension                 SEQUENCE {}                     OPTIONAL    --
Need OP
}
-- ASN1STOP
================================End of Change==================================
```

What is claimed is:

1. A method for identifying Bluetooth interference in user equipment (UE) comprising first and second radio components on a single platform, comprising:
   detecting signal interference at the first radio component;
   measuring received signal power at the first radio component at predetermined time intervals to generate a plurality of measurement values corresponding to a Bluetooth Synchronous Connection Oriented (SCO) transmission or Extended Synchronous Connection Oriented (eSCO) transmission; and
   sending an in-device coexistence indicator message from the first radio component if the plurality of measurement values exceed a threshold power value to indicate SCO or eSCO interference from the second radio component.

2. The method of claim 1 where the first radio component comprises an LTE component, and where the second radio component comprises a Bluetooth (BT) component.

3. The method of claim 1, where measuring received signal power at the first radio component comprises measuring a Received Signal Strength Indicator (RSSI) of the received signal power at predetermined subframes.

4. The method of claim 3, where measuring the RSSI comprises measuring RSSI every subframe configured by a network when the second radio component is enabled.

5. The method of claim 1, where measuring received signal power comprises measuring a Received Signal Strength Indicator (RSSI) every subframe which is overlapped with a Bluetooth transmission slot.

6. The method of claim 1, where measuring received signal power comprises measuring a Received Signal Strength Indicator (RSSI) on OFDM symbol containing reference symbols at a predetermined antenna port.

7. The method of claim 1, where sending the in-device coexistence indicator message comprises sending the in-device coexistence indicator to a higher layer.

8. The method of claim 1, where sending the in-device coexistence indicator message comprises sending the in-device coexistence indicator message if an average of multiple measurement values taken at predetermined time intervals exceeds the threshold power value.

9. The method of claim 1, where the threshold power value is fixed.

10. The method of claim 1, where the threshold power value is variable based on a transmission class for the second radio component.

11. The method of claim 1, where measuring received signal power comprises:
   measuring Received Signal Strength Indicator (RSSI) values in Bluetooth (BT) measurement subframes and non-BT measurement subframes; and
   comparing RSSI values between the BT measurement subframe and non-BT measurement subframe to compute a difference value.

12. The method of claim 11, where the in-device coexistence indicator message is sent if the difference value exceeds a predetermined threshold value.

13. The method of claim 1, where measuring received signal power comprises:
   measuring Received Signal Strength Indicator (RSSI) values in Bluetooth (BT) measurement subframes; and
   comparing RSSI values between the BT measurement subframe and normal UE RSSI measurements measured in any subframe to compute a difference value.

14. The method of claim 13, where the in-device coexistence indicator message is sent if the difference value exceeds a predetermined threshold value.

15. The method of claim 1, where measuring received signal power comprises measuring a Received Signal Strength Indicator (RSSI) at predetermined time intervals corresponding to a predetermined SCO or eSCO transmission mode being used by the second radio component.

16. The method of claim 1, where measuring received signal power comprises processing the signal interference at the first radio component to identify a synchronous transmission pattern using a predetermined power threshold value and periodicity value.

17. The method of claim 16, where the predetermined power threshold value is a maximum permitted transmit power value plus or minus a marginal threshold adjustment value.

18. The method of claim 16, where the periodicity value is a fixed interference time gap value plus or minus a marginal adjustment time gap value.

19. The method of claim 1, where measuring received signal power comprises:
   measuring received signal power at the first radio component over consecutive Bluetooth time slots to identify a plurality of peak signals which each exceed a predetermined power threshold value;
   measuring a time gap between two consecutive peak signals; and
   determining if the time gap corresponds to an SCO transmission or eSCO transmission.

20. The method of claim 19, where measuring received signal power comprises applying an adjustable measurement window at the first radio component to measure the signal interference at predetermined time intervals.

21. The method of claim 19, where the predetermined power threshold value is computed as a combination of a maximum permitted transmit power value and a marginal threshold adjustment value.

22. The method of claim 21, where the maximum permitted transmit power value is variable based on a transmission class for the second radio component.

23. The method of claim 21, where the maximum permitted transmit power value and marginal threshold adjustment value are configure by one or more higher layers.

24. The method of claim 19, where determining if the time gap corresponds to an SCO transmission or eSCO transmission comprises:
   computing an adjustable reference gap value corresponding to an SCO transmission or eSCO transmission as a combination of a fixed interference time gap and a marginal adjustment time gap; and
   determining if the adjustable reference gap value matches the time gap.

25. The method of claim 24, where the fixed interference time gap and a marginal adjustment time gap are configure by one or more higher layers.

26. The method of claim 19, further comprising measuring received signal power at the first radio component over consecutive Bluetooth time slots to identify a plurality of off-peak signals adjacent to the plurality of peak signals.

27. The method of claim 19, where the plurality of measurement values comprises a plurality of E-UTRA Carrier Received Signal Strength Indicator (RSSI) measurement values.

28. The method of claim 27, where measuring the plurality of E-UTRA Carrier Received Signal Strength Indicator (RSSI) measurement values comprises measuring a linear average of total received power observed during a predetermined Bluetooth time slot in a specified measurement bandwidth over N number of resource blocks from all sources.

29. The method of claim 19, where measuring received signal power to identify a plurality of peak signals comprises identifying a peak received signal as a Bluetooth Received Signal Strength Indicator (RSSI) when transmission timing between the first and second radio components is not coordinated.

30. The method of claim 1, further comprising receiving a UEInformationRequest message from an E-UTRAN network node which comprises an In-DeviceCoexistenceReq information element to determine if the UE has requested an in-device coexistence operation mode due to detected Bluetooth interference.

31. The method of claim 16, where either or both the predetermined power threshold value and periodicity value are received at the UE as system parameters from a network node.

32. The method of claim 1, where measuring received signal power comprises processing the one or more signals at the first radio component to identify a synchronous transmission pattern using one or more interference identification parameters.

33. The method of claim 1, where measuring received signal power comprises processing the one or more signals at the first radio component to identify a synchronous transmission pattern using one or more interference identification parameters received at the UE as system parameters from a network node.

34. The method of claim 33, further comprising receiving a Radio Resource Control (RRC) message requesting identification-related parameters and configuration status of the in-device coexistence from the UE in order to allocate the one or more interference identification parameters.

35. The method of claim 34, where receiving the RRC message comprises receiving a UEInformationRequest message requesting identification-related parameters and configuration status of the in-device coexistence from the UE.

36. The method of claim 11, where BT measurement subframes comprise subframes which are overlapped with BT transmission slots, and where non-BT measurement subframes comprise subframes which are not included in BT measurement subframes.

37. A user equipment device comprising first and second radio components on a single platform, comprising:
   one or more antennas for transmitting and receiving one or more signals; and
   a first radio component comprising a first plurality of RF protocol layers;
   a second radio component comprising a second plurality of RF protocol layers; and
   processor control logic and/or circuitry configured to identify Bluetooth interference at the first radio component caused by the second radio component by:
      detecting signal interference at the first radio component;
      measuring received signal power at the first radio component at predetermined time intervals to generate a plurality of measurement values corresponding to a Bluetooth Synchronous Connection Oriented (SCO) transmission or Extended Synchronous Connection Oriented (eSCO) transmission; and
   sending an in-device coexistence indicator message from the first radio component if the plurality of measurement values exceed a threshold power value to indicate SCO or eSCO interference from the second radio component.

38. The user equipment device of claim 37, where the processor control logic and/or circuitry comprises:
   an interference detection module which identifies the plurality of measurement values which exceed a power threshold value; and an interference decision module which identifies the plurality of measurement values which satisfy a periodicity value.

39. The user equipment device of claim 38, where the power threshold value is computed as a combination of a maximum permitted transmit power value and a marginal threshold adjustment value.

40. The user equipment device of claim 39, where the maximum permitted transmit power value and marginal threshold adjustment value are configured by one or more higher layers.

41. The user equipment device of claim 38, where the periodicity value is computed as a combination of a fixed interference time gap and a marginal adjustment time gap.

42. The user equipment device of claim 41, where the fixed interference time gap and a marginal adjustment time gap are configure by one or more higher layers.

43. A computer program product comprising a non-transitory computer readable storage medium having computer readable program code embodied therein, said computer readable program code adapted to be executed to implement a method for identifying Bluetooth interference in user equipment (UE) comprising first and second radio components on a single platform, comprising:

instructions for detecting signal interference at the first radio component;

instructions for measuring received signal power at the first radio component at predetermined time intervals to generate a plurality of measurement values corresponding to a Bluetooth Synchronous Connection Oriented (SCO) transmission or Extended Synchronous Connection Oriented (eSCO) transmission; and instructions for sending an in-device coexistence indicator message from the first radio component if the plurality of measurement values exceed a threshold power value to indicate SCO or eSCO interference from the second radio component.

44. The method of claim 1, where sending the in-device coexistence indicator message comprises sending the in-device coexistence indicator to a network.

* * * * *